United States Patent
Wood et al.

(10) Patent No.: US 11,344,831 B2
(45) Date of Patent: May 31, 2022

(54) FILTRATION SYSTEM

(71) Applicant: NEXUS EWATER PTY LTD, Fyshwick (AU)

(72) Inventors: Tom Wood, Fyshwick (AU); Andrew Hermann, Fyshwick (AU)

(73) Assignee: NEXUS EWATER PTY LTD, Fyshwick (AU)

( * ) Notice: Subject to any disclaimer, the term of this patent is extended or adjusted under 35 U.S.C. 154(b) by 755 days.

(21) Appl. No.: 15/516,225

(22) PCT Filed: Sep. 29, 2015

(86) PCT No.: PCT/AU2015/050584
§ 371 (c)(1),
(2) Date: Mar. 31, 2017

(87) PCT Pub. No.: WO2016/049695
PCT Pub. Date: Apr. 7, 2016

(65) Prior Publication Data
US 2017/0304754 A1  Oct. 26, 2017

(30) Foreign Application Priority Data

Oct. 1, 2014 (AU) .................................. 2014903913

(51) Int. Cl.
*B01D 39/02* (2006.01)
*C02F 1/28* (2006.01)
(Continued)

(52) U.S. Cl.
CPC .............. *B01D 39/02* (2013.01); *C02F 1/001* (2013.01); *C02F 1/283* (2013.01); *C02F 1/32* (2013.01);
(Continued)

(58) Field of Classification Search
CPC ........ B01D 39/02; B01D 24/00; B01D 24/24; B01D 17/035; B01D 17/028; B01D 17/0205; B01D 17/0211; C02F 1/001; C02F 1/283; C02F 1/32; C02F 1/28; C02F 1/00; C02F 2301/028; C02F 2303/02;
(Continued)

(56) References Cited

U.S. PATENT DOCUMENTS

| | | | | |
|---|---|---|---|---|
| 5,534,202 A * | 7/1996 | Roberts | ................. | B01D 24/24 261/122.1 |
| 7,364,654 B2 * | 4/2008 | Schulz | ................... | C02F 9/005 210/198.1 |
| 2013/0313191 A1 * | 11/2013 | Wolf | ......................... | C02F 9/00 210/638 |

FOREIGN PATENT DOCUMENTS

| WO | WO 2011/160185 A1 | 12/2011 |
|---|---|---|
| WO | WO 2016/033648 A1 | 3/2016 |

OTHER PUBLICATIONS

International Search Report and Written Opinion of the International Searching Authority for International Application No. PCT/AU2015/050584.

\* cited by examiner

*Primary Examiner* — Akash K Varma
(74) *Attorney, Agent, or Firm* — Finnegan, Henderson, Farabow, Garrett & Dunner, LLP

(57) ABSTRACT

A filter (10) includes a receptacle (12) defining a chamber (14). A granular filtering medium (16) is contained in the chamber (14) of the receptacle (12). A disrupter arrangement (18) is mounted in the chamber (14) of the receptacle (12), the disrupter arrangement (18) serving to disrupt agglomeration of the granular filtering medium (16) within the chamber (14) of the receptacle (12).

8 Claims, 5 Drawing Sheets

(51) Int. Cl.
 *C02F 1/00* (2006.01)
 *C02F 1/32* (2006.01)
(52) U.S. Cl.
 CPC .... *C02F 2301/028* (2013.01); *C02F 2303/02* (2013.01)
(58) Field of Classification Search
 CPC ...... C02F 2201/005; C02F 9/00; C02F 9/005; C02F 1/24; C02F 1/20; C02F 1/78; C02F 1/004; C02F 2103/002; C02F 2209/38; C02F 2209/40; C02F 2209/00; B03D 2203/008; B03D 1/023; B03D 1/26; B03D 1/1462; B03D 1/14; B01F 3/04
 USPC .............................................. 210/136, 198.1
 See application file for complete search history.

FILTRATION SYSTEM

CROSS-REFERENCE TO RELATED APPLICATIONS

The present application is a national phase application under 35 U.S.C. § 371 of International Application No. PCT/AU2015/050584, filed on Sep. 29, 2015, and which claims priority from Australian Provisional Patent Application No. 2014903913 filed on Oct. 1, 2014, the contents of both of which are incorporated herein by reference in their entirety.

TECHNICAL FIELD

This disclosure relates, generally, to a filtration system and, more particularly but not necessarily exclusively, to a filter and to a filtration system for use in waste water treatment systems including the filter.

BACKGROUND

Granulated filter products, such as activated carbon filters, are notoriously difficult to use effectively. There are various drawbacks in using such products such as channelling, clumping when moist, being physically fragile and requiring a moist, but aerated environment.

In addition, biological activity used in association with the granulated filter material can extend the performance of the filter and greatly extend its lifetime. However, introducing high biological activity increases the possibility of odours, such odours adversely affecting the product.

The problems set out in the preceding paragraph are amplified where the waste water being treated has a lower overall contaminant and biological activity level. These problems are amplified further in the case of smaller scale treatment plants.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In a first aspect, there is provided a filter which includes
a receptacle defining a chamber;
a granular filtering medium contained in the chamber of the receptacle; and
a disrupter arrangement mounted in the chamber of the receptacle, the disrupter arrangement serving to disrupt agglomeration of the granular filtering medium within the chamber of the receptacle.

The disruptor arrangement may be configured to disrupt agglomeration of the granular filtering medium whether as a whole or in part.

The filter may include a single opening defined in the receptacle, the opening serving as both an access opening for injecting waste water to be filtered into the chamber of the receptacle and an egress opening for the discharge of filtered water from the receptacle.

The filter may include a turbulence imparting mechanism arranged in the chamber of the receptacle, the turbulence imparting mechanism imparting turbulence to the waste water as it is injected into the chamber through the opening. The turbulence imparting mechanism may comprise a porting arrangement arranged in the chamber of the receptacle in communication with the opening, the porting arrangement defining at least one port for the injection of the waste water into the chamber of the receptacle.

The porting arrangement may comprise a plurality of ports through which the waste water is injected into the chamber of the receptacle. In an embodiment, the porting arrangement may comprise two ports. In one configuration, the ports may face away from each other towards opposite walls of the receptacle to create a hydraulic step. In other configurations, the ports may face towards each other to define intersecting streams of waste water to be filtered, the ports may be at different heights, the ports may be arranged to cause the waste water to flow as chords of a right circular cylindrical receptacle and/or the ports may be arranged to direct the flow at an angle to a longitudinal axis of the chamber to encourage turbulent flow and to improve waste water/filter medium contact.

The at least one port may be semi-occluded to encourage turbulent flow and to inhibit escape of the filter medium when the filtered water is discharged from the chamber. The semi-occlusion of the at least one port may be effected by a plurality of vanes arranged in the at least one port. The, or each, port may be circular and the vanes may extend radially.

The disrupter arrangement may comprise a plurality of spaced baffles arranged in the chamber of the receptacle. Each of at least some of the baffles may comprise elongate elements extending across the chamber of the receptacle. In addition, the baffles may include vanes or plates extending into the chamber. The elongate elements and, where applicable, the vanes or plates may be configured, e.g. by being suitably shaped, to impart turbulent flow to the waste water.

The elongate elements may be arranged in the chamber in a distributed manner across a vertical and a horizontal cross-section of the chamber with a spacing selected so as to minimise the likelihood of the waste water forming channels in the granular filter medium. It will be appreciated that the formation of such channels, or "channelling", arises due to the tendency of a moist granular filtering medium to agglomerate. The formation of such channels reduces contact between the waste water and the filter medium and is, therefore, undesirable.

The receptacle may be a moulding and the disrupter arrangement may be moulded into the receptacle. In an embodiment, the receptacle and the baffles of the disrupter arrangement may be a moulding of a suitable synthetic plastics material which is formed by roto-moulding.

In a second aspect, there is provided a filtration system which includes
a primary treatment processing module;
a filter, as described above, arranged downstream of the primary treatment processing module; and
secondary treatment equipment arranged downstream of the filter.

The primary treatment processing module may comprise a bubble separator unit for an initial separation of contaminants from the waste water.

The primary treatment processing module may communicate with the filter via an injection pump and a one-way valve, the one-way valve serving as an isolation valve to inhibit back flow of waste water, treated in the filter, into the primary treatment processing module.

The secondary treatment equipment may communicate with the filter via a discharge pump and a valve. The secondary treatment equipment may comprise at least one of a particle filtration module and a sterilisation module. In an embodiment, the secondary treatment equipment comprises both the particle filtration module and the sterilisation module.

The system may include a storage unit for storing treated water output by the secondary treatment equipment.

The system may include a feedback mechanism for feeding back a pulse of water from the storage unit at least into the secondary treatment equipment for flushing the secondary treatment equipment.

BRIEF DESCRIPTION OF DRAWINGS

Embodiments of the disclosure are now described by way of example with reference to the accompanying drawings in which.

DETAILED DESCRIPTION OF EXEMPLARY EMBODIMENTS

Referring initially to FIGS. 1-7 of the drawings, reference numeral 10 generally designates an embodiment of a filter for use in a system 50 (FIG. 8) for the treatment of waste water. The term "waste water" is to be understood as covering both grey water and sewage. While the system 50 in which the filter 10 is used is intended particularly for use in the treatment of grey water, the system 50 can also treat waste water which includes sewage.

Figure 1:
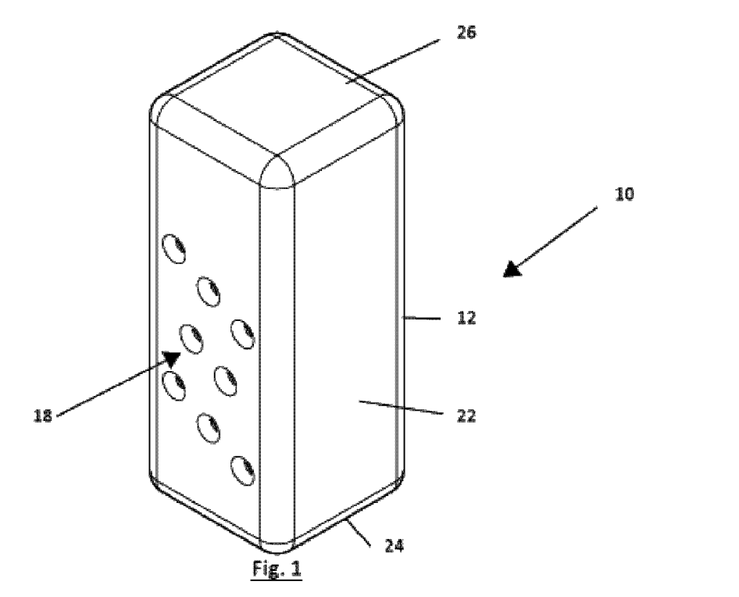
FIG. 1 shows a perspective view of an embodiment of a filter for use in a filtering system for filtering waste water.
Figure 2:
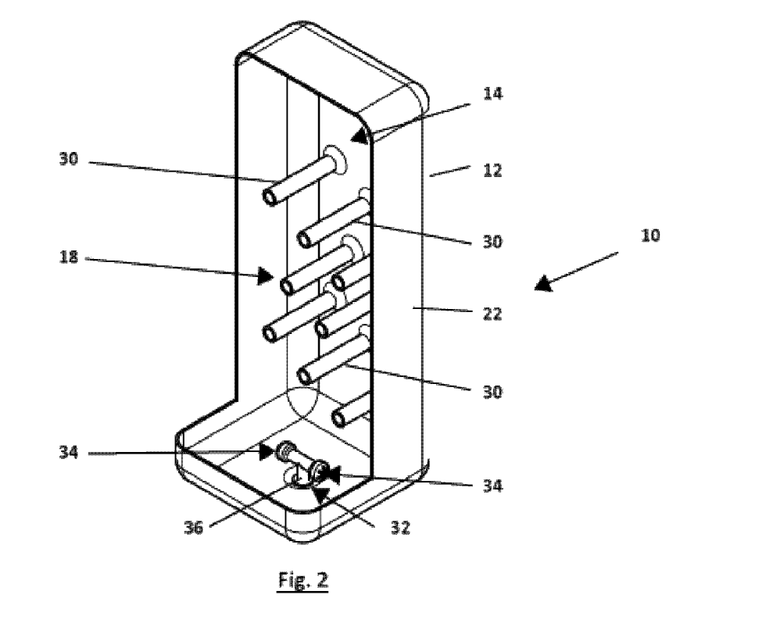
FIG. 2 shows a cutaway, perspective view of a part of the filter with a filtering medium of the filter omitted.
Figure 3:
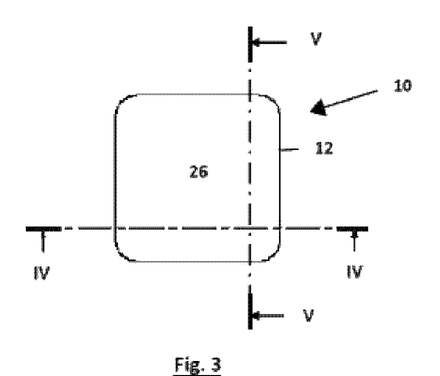
FIG. 3 shows a plan view of the filter of FIG. 1.
Figure 4:
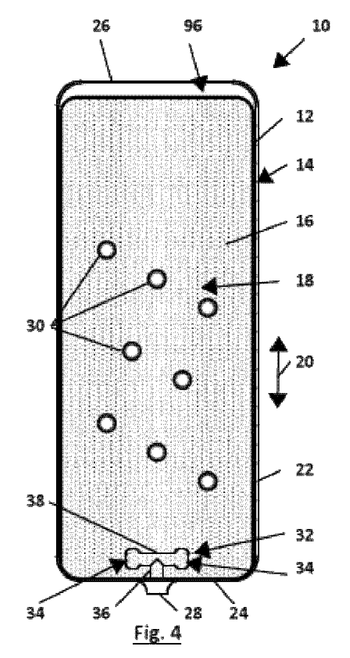
FIG. 4 shows a sectional side view of the filter of FIG. 1 taken along line IV-IV in FIG. 3 of the drawings.

The filter 10 comprises a receptacle 12 defining a chamber 14 (FIG. 2). The filter 10 is in the form of a carbon filter, also known as a "carbon contact column". Thus, the filter 10 contains a granular filtering medium in the form of activated carbon 16 (FIG. 4) in the chamber 14 of the receptacle 12. It is to be noted that the activated carbon 16 is omitted from FIGS. 2, 5 and 7 of the drawings for ease of explanation and for the sake of clarity.

A disrupter arrangement 18 is mounted in the chamber 14 of the receptacle 12. The disrupter arrangement 18 disrupts agglomeration of the activated carbon 16 so as to disrupt piston-like movement of the entire body of activated carbon 16 as a substantially single entity in the direction of arrows 20 (FIG. 4) within the chamber 14 of the receptacle 12.

In the illustrated embodiment, the receptacle 12 is substantially square when viewed in plan having side walls 22 extending from a floor 24 and being closed off by a top 26. A single opening 28 is defined in the floor 24 of the receptacle 12. The opening 28 serves as both an access opening for injecting waste water to be filtered into the chamber 14 of the receptacle 12 as well as an egress opening for discharging filtered water from the receptacle 12.

It will be appreciated, however, that the receptacle 12 could have any other suitable shape such as a right circular cylindrical shape, an elliptical shape when viewed in plan or any other polyhedral shape.

Figure 5:
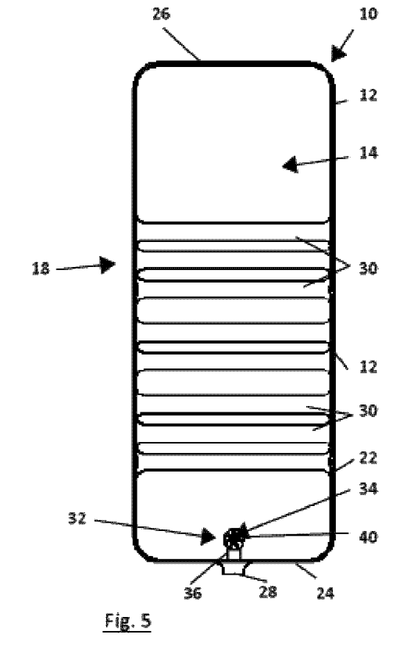
FIG. 5 shows a sectional side view of the filter of FIG. 1 taken along line V-V in FIG. 3 of the drawings with the filtering medium omitted.
Figure 6:
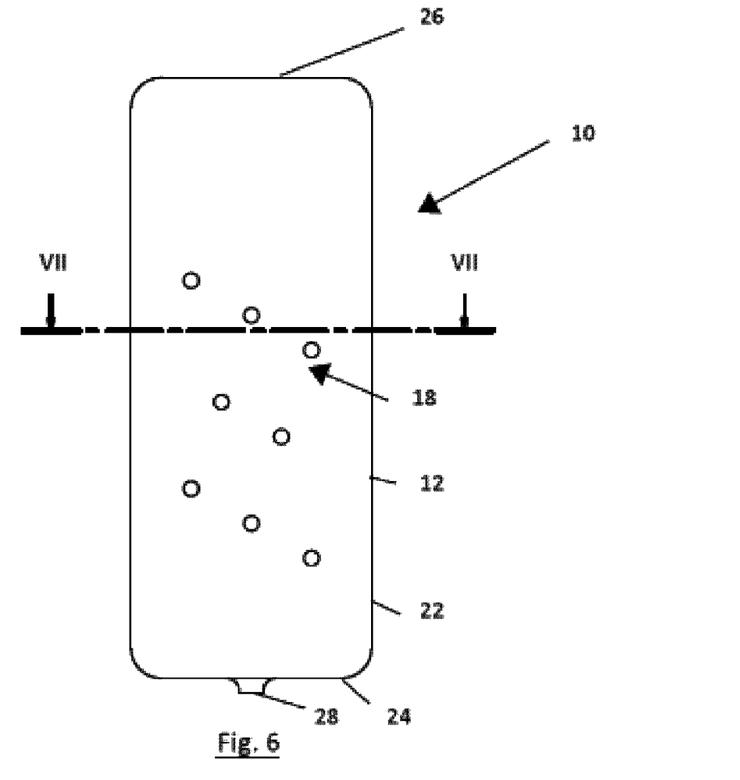
FIG. 6 shows a side view of the filter.
Figure 7:
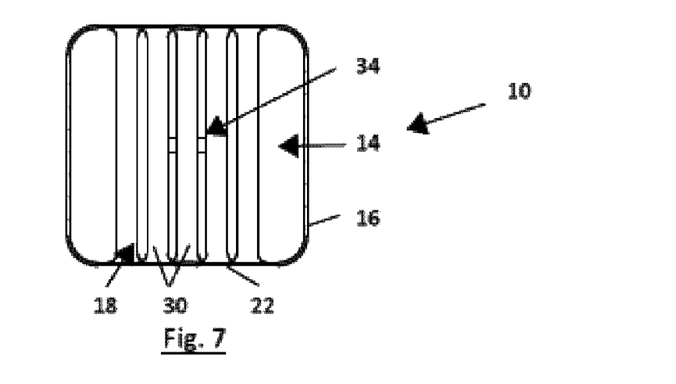
FIG. 7 shows a sectional plan view of the filter taken along line VII-VII in FIG. 6 of the drawings with the filtering medium omitted.

The disruptor arrangement 18 comprises a plurality of baffles 30 arranged in the chamber 14 of the receptacle 12 to extend across the chamber 14 as shown, for example in FIGS. 5 and 7 of the drawings. Each baffle 30 is in the form of an elongate element such as a rod extending from one of the side walls 22 to the opposite side wall 22.

The baffles 30 are arranged in a three-dimensional staggered, lattice-type arrangement spaced both vertically and horizontally from one another. As illustrated schematically, for example in FIGS. 4 and 6 of the drawings, the baffles 30 form a zig-zag arrangement in the chamber 14 of the receptacle 12. The baffles 30 are therefore distributed within the chamber with a spacing selected so as to minimise the likelihood of channels forming in the activated carbon 16. In other words, the baffles 30 are configured to minimise clumping of the activated carbon 16 both to inhibit the formation of the channels and to inhibit movement of the activated carbon 16 as a unified body.

It will be appreciated that both the formation of channels in, and the clumping of, the activated carbon 16, whether as a whole or in part, reduces the region of contact between the waste water injected into the chamber 14 of the receptacle 12 and, in so doing, reduces the filtering efficiency of the filter 10.

The baffles 30 further serve to impart turbulence to waste water injected into the chamber 14 of the receptacle 12. While, in the illustrated embodiment, each baffle 30 is illustrated as a rod, it will be appreciated that the shape of each baffle 30 could be selected to aid in imparting turbulence. Thus, for example, the baffles 30 may have a corkscrew shape, the baffles 30 may be in the form of vanes (whether straight or with a slight spiral imparted to the vane), or combinations of the foregoing.

The rod-shaped baffles 30 are selected from an ease of manufacturing point of view. In the illustrated embodiment, the receptacle 12 is of a suitable synthetic plastics material with the baffles 30 being integrally formed with at least the walls 22 of the receptacle 12 as a one-piece unit in a suitable moulding process such as, for example, a roto-moulding process.

The filter 10 includes a turbulence imparting mechanism, in the form of a porting arrangement 32, arranged in the chamber 14 of the receptacle 12. The porting arrangement 32 is in communication with the opening 28 of the receptacle. The porting arrangement 32, further, defines a plurality of ports 34 for the injection of the waste water into the chamber 14 of the receptacle 12.

In the illustrated embodiment, the porting arrangement 32 is in the form of a T-piece, a stem 36 of the porting arrangement 32 being in communication with the opening 28 of the receptacle 12. A cross-piece 38 (FIG. 4) of the porting arrangement defines a pair of oppositely directed ports 34. It will be appreciated that, in other embodiments, the ports 34 of the porting arrangement 32 could face towards each other, parallel to each other (whether facing the same way or in opposite directions) or pointing at different elevations.

Each port 34 is semi-occluded both to encourage turbulent flow of the waste water as it is injected into the chamber 14 of the receptacle 12 and also to inhibit the escape of activated carbon 16 through the opening 28 of the receptacle 12 when filtered water is discharged through the opening 28 of the receptacle 12. In the illustrated example, each port 34 is semi-occluded by having radially extending vanes 40 (FIG. 5) mounted in the port 34.

It will be appreciated that turbulent flow is to be encouraged. Otherwise, boundary layers may occur if the waste water flows in the filter 10 in a laminar manner. The formation of boundary layers is undesirable since it reduces mixing of the waste water with the activated carbon 16 of the filter 10.

Figure 8:
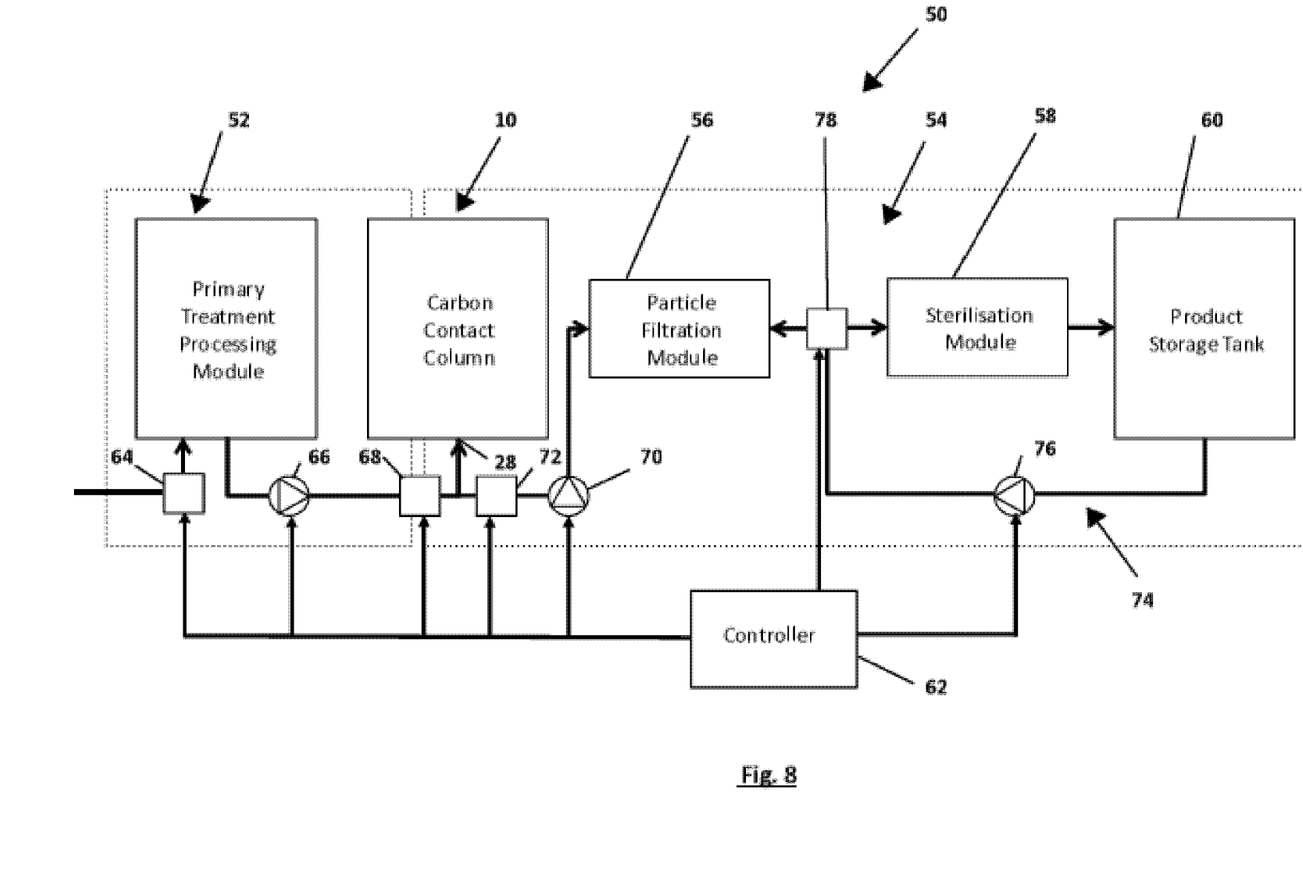
FIG. 8 shows a schematic block diagram of an embodiment of a filtration system including the filter of FIGS. 1-7.

The filter 10 forms part of a filtration system which is illustrated in FIG. 8 of the drawings and which is designated generally by the reference numeral 50.

The filtration system 50 includes a primary treatment processing module 52. The primary treatment processing module 52 is a bubble separator for removing surfactants from the waste water as described, for example, in greater detail in our co-pending International Patent Application No. PCT/AU2015/050513 dated 1 Sep. 2015 and entitled "Apparatus for treating water". The disclosure of the '513 application deals with an improvement to the Applicant's system as described in International Patent Publication No. WO/2011/160185 filed on 24 Jun. 2011 and entitled "A process and apparatus for purifying water".

As described in WO/2011/160185, the bubble separator separates bubbles and any entrained contaminants from aerated waste water. The disclosure of PCT/AU2015/050513 describes an improvement in effecting separation of the surfactants from the waste water. To the extent permitted by the applicable national law, both applications are incorporated herein by reference in their entirety.

The filtration system 50 further includes secondary treatment equipment 54 arranged downstream of the filter 10. The secondary treatment equipment includes a particle filtration module 56 arranged downstream of the filter 10 and a sterilisation module 58 arranged downstream of the particle filtration module 58.

Water output from the sterilisation module 58 is fed to a storage unit, in the form of a storage tank 60.

The filtration system 50 includes a controller 62. Waste water to be treated is delivered to the primary treatment processing module 52 via a pump or valve 64. After treatment in the module 52, the water is pumped via an injection pump 66 and an isolation, or one-way, valve 68 into the receptacle 12 of the filter 10 via the opening 28. After filtering in the filter 10, filtered water is discharged by means of a discharge pump 70 and a valve 72 into the particle filtration module 56. The valve 68 serves to inhibit back flow of water upstream of the filter 10 into the primary treatment processing module 52.

The filtration system 50 includes a feedback mechanism 74 comprising a pump 76 and a three-way valve 78 interposed between the particle filtration module 56 and the sterilisation module 58. The controller 62 controls operation of each of the pump or valve 64 (as the case may be), the valves 68, 72 and 78 as well as each of the pumps 66, 70 and 76.

The particle filtration module 56 comprises a pleated filter and the sterilisation module 58 comprises an ultraviolet light source (UV unit). The pleated filter of the particle filtration module 56 facilitates additional filtering of particles entrained in the filtered water discharged from the filter 10. The UV unit of the sterilisation module 58 exposes the water discharged from the particle filtration module 56 to ultraviolet light to effect at least partial sterilisation of the water prior to being charged into the storage tank 60.

The storage tank 60 retains the treated water for re-use such as in a garden of a dwelling or for flushing toilets of a premises or dwelling in which the system 50 is installed.

Figure 9:
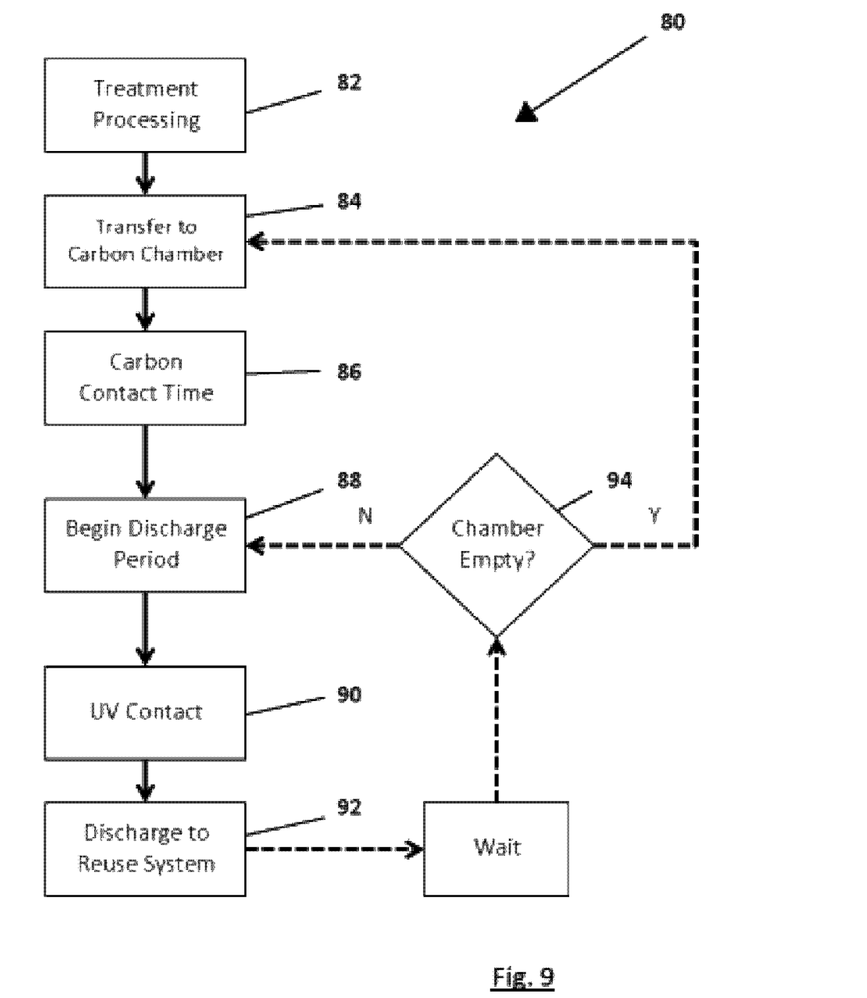
FIG. 9 shows a flow chart of an embodiment of a method of filtering waste water using the system of FIG. 8.

Referring to FIG. 9 of the drawings, a flow chart of a method of operating the filtration system 50 and, in particular, the filter 10, is described and is designated generally by the reference numeral 80. As an initial step 82, waste water to be treated is charged into the primary treatment processing module 52 via the inlet pump or valve 64 under the operation of the controller 62.

After treatment in the primary treatment processing module 52, the controller 62 activates the injection pump 66 which discharges water from the primary treatment processing module 52 and injects it, via the isolation valve 68, into the chamber 14 of the receptacle 12 of the filter 10 as shown at step 84. The operation of the filter 10 and ancillary equipment associated with the filter 10, more particularly, the pumps 66 and 70 and the valves 68 and 72 is described in greater detail in our co-pending International Patent Application, claiming priority from Australian Provisional Patent Application No. 2014903912, and filed on the same day as this application and entitled "Method of filtering waste water". The contents of the co-pending International Patent Application referenced in this paragraph are incorporated herein by reference in its entirety, to the extent permitted by the applicable national law.

As described in the co-pending application referred to in the previous paragraph, once the waste water has been injected into the filter 10, it remains in contact with the activated carbon 16 within the filter 10 for a specified dwell time, for example, about 30 minutes as shown at 86 in FIG. 9 of the drawings. Following expiry of the dwell time, the controller 62 opens the valve 72 and activates the pump 70 to discharge the filtered water from the filter 10 and to charge it into the particle filtration module 56 as shown at 88.

As further described in the co-pending application, water is discharged from the filter 10 in a pulsed manner via control of the discharge pump 70 by the controller 62.

After passing through the particle filtration module 56, the treated water is charged, via the three-way valve 78, into the sterilisation module 58 to undergo UV sterilisation as shown at 90 in FIG. 9 of the drawings. Following sterilisation, the treated water is charged into the storage tank 60 to be re-used as required as shown at 92.

The controller 62 is operable to monitor the state of the chamber 14 of the receptacle 12 of the filter 10 as shown at 94 and to transfer water from the primary treatment processing module 52 into the filter 10 if the chamber 14 is empty or to discharge filtered water from the chamber 14 after expiry of the dwell time.

Activated carbon filters such as the filter 10 can be difficult to use effectively. There are a number of reasons for this, principally clumping of the activated carbon leading to the formation of channels within the activated carbon 16 as water to be treated passes through it. As indicated above, the formation of these channels is undesirable since the channels reduce the contact area between the activated carbon 16 and the water.

In extreme cases, the entire body of activated carbon 16 contained within the chamber 14 of the receptacle 12 can agglomerate into a unified body to move relative to the receptacle 12 in a piston-like manner. This further adversely impacts on the contact area and contact time between the activated carbon 16 and the water to be filtered.

It is noted that the activated carbon 16 is spaced from the top 26 of the receptacle 12 by a gap 96. In the absence of the baffles 30 of the disruptor arrangement 18, there is a possibility that the entire body of the activated carbon 16 would move in the piston-like manner when water is injected into the chamber 14 of the receptacle 12 to close that gap 96. Water would then dam under the activated carbon 16 reducing the contact area between the water and the activated carbon 16. The disruptor arrangement 18 thus inhibits this movement of the activated carbon 16 as a whole.

Further, the activated carbon 16 operates better in a moist, but aerated environment. The activated carbon 16 also exhibits improved performance in the presence of biological activity. It will be appreciated that waste water to be treated contains bacteria which, depending on conditions, are either aerobic bacteria or anaerobic bacteria. Aerobic bacteria require the presence of oxygen, hence the need for the activated carbon 16 to be aerated. In the absence of oxygen, the aerobic bacteria converts to anaerobic bacteria resulting in malodorous conditions arising.

The malodorous conditions adversely affect not only the filter 10 but the components downstream of the filter 10. By pulsing the water as it is discharged from the filter 10, the activated carbon 16 can be retained in a moist but aerated condition. The applicant has found that the lifespan of the activated carbon 16 of the filter 10 can be considerably increased, by up to 10 to 50 times, in the presence of biological activity.

However, to obtain this improved lifespan of the activated carbon 16, it requires that the activated carbon 16 remain moist but not completely immersed for extended periods of time. Immersion of the activated carbon 16 for an extended period increases the risk of the oxygen in the filter 10 being depleted causing anaerobic bacterial activity to occur. Conversely, if the activated carbon 16 is allowed to dry out completely, the bacteria take longer to re-activate and the lifespan of the activated carbon 16 is reduced.

By providing the disruptor arrangement 18, the baffles 30 of the disruptor arrangement serve to inhibit clumping of the activated carbon 16 facilitating wetting of the carbon 16 by the water and retaining the activated carbon 16 in a moist, but aerated, condition. As indicated above, this improves the lifespan of the filter 10.

Another benefit of discharging the water from the filter 10 in a pulsed fashion is that the pulsed water is made available to the UV unit of the sterilisation module 58. A problem with keeping the UV unit continuously energised is that it may overheat reducing its lifespan. In addition, continuously cycling the UV unit on and off also reduces its lifespan. By providing pulses of filtered water to the UV unit, the UV unit can remain energised and is periodically cooled by the pulses of water.

As indicated above, there is a risk of odours arising in the equipment downstream of the filter 10. To minimise this risk, the feedback mechanism 74 of the filtration system 50 is provided. The controller 62 periodically extracts a pulse of sterilised water from the storage tank 60 and feeds it, via the three-way valve 78, into the particle filtration module 56 and the sterilisation module 58 to flush those modules 56 and 58. A portion of this pulse of water may also be injected through the filtration module 56 into the pump 70 and valve 72 to flush the pump 70 and valve 72 as well.

Thus, it is a benefit of the filtration system 50 that the feedback mechanism 74 assists in minimising the formation of malodorous conditions and facilitating the taking of remedial action when such conditions do arise.

It is therefore an advantage of the described embodiments that a filter 10 is provided which minimises problems associated with the use of activated carbon, in particular, minimises the formation of channels in the activated carbon 16 and minimises clumping of the activated carbon 16. The filter 10 further has improved moisture retention and aeration capabilities with the consequential improved lifespan of the activated carbon 16 of the filter 10. A further advantage of the described embodiments is that the filter 10 and the manner in which it is operated minimises the risk of malodorous conditions arising.

Where the waste water to be treated comprises grey water in a residential dwelling, the nutrient load is lower and the scale of any grey water treatment equipment is correspondingly smaller. This creates difficulties in using an activated carbon filter of the type generally used in grey water treatment since these filters are energy intensive or require mechanical mixing systems. Such systems cannot be used in smaller/lower cost installations. However, the provision of the filter 10 and the filtration system 50, as disclosed, lend themselves for use in smaller and/or lower cost grey water treatment installations. The provision of the disruptor arrangement 18 within the filter 10 physically breaks up agglomerated activated carbon thereby promoting wetting and mixing and also introduces turbulence which encourages mixing of the water with the activated carbon 16.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A filter which includes:
   a receptacle defining a chamber;
   a granular filtering medium contained in the chamber of the receptacle;
   a plurality of baffles mounted in the chamber of the receptacle and at least partially surrounded by the granular filtering medium, the plurality of baffles being mounted in the chamber in a three-dimensional staggered, lattice arrangement, spaced both vertically and horizontally from one another, across a vertical and a horizontal cross-section of the chamber with a spacing between the plurality of baffles serving to disrupt agglomeration of the granular filtering medium within the chamber of the receptacle; and
   a turbulence imparting mechanism arranged in the chamber of the receptacle, the turbulence imparting mechanism imparting turbulence to waste water as the waste water is injected into the chamber through a single opening in the receptacle.

2. The filter of claim 1 wherein the single opening serves as both an access opening for injecting the waste water to be filtered into the chamber of the receptacle and an egress opening for discharge of filtered water from the receptacle.

3. The filter of claim 1 in which the turbulence imparting mechanism comprises a porting arrangement arranged in the chamber of the receptacle in communication with the single opening, the porting arrangement defining at least one port for the injection of the waste water into the chamber of the receptacle.

4. The filter of claim 3 in which the porting arrangement comprises the at least one port through which the waste water is injected into the chamber of the receptacle.

5. The filter of claim 3 in which the at least one port is semi-occluded to encourage turbulent flow and to inhibit escape of the granular filtering medium when filtered water is discharged from the chamber.

6. The filter of claim 5 in which the semi-occlusion of the at least one port is effected by a plurality of vanes arranged in the at least one port.

7. The filter of claim 1 in which at least some of the plurality of baffles comprises an elongate element extending across the vertical and the horizontal cross-section of the chamber of the receptacle.

8. The filter of claim 1 in which the receptacle is a moulding.

* * * * *